United States Patent
Adluri et al.

(10) Patent No.: US 10,949,388 B2
(45) Date of Patent: Mar. 16, 2021

(54) SYSTEMS AND METHODS FOR DISTRIBUTED DATA STORAGE AND DELIVERY USING BLOCKCHAIN

(71) Applicant: Advanced Messaging Technologies, Inc., Los Angeles, CA (US)

(72) Inventors: Mahender Adluri, Tustin, CA (US); Robert Taylor, Rancho Palos Verdes, CA (US)

(73) Assignee: ADVANCED MESSAGING TECHNOLOGIES, INC., Los Angeles, CA (US)

( * ) Notice: Subject to any disclaimer, the term of this patent is extended or adjusted under 35 U.S.C. 154(b) by 180 days.

(21) Appl. No.: 16/192,878

(22) Filed: Nov. 16, 2018

(65) Prior Publication Data

US 2020/0159696 A1    May 21, 2020

(51) Int. Cl.
*G06F 21/64*     (2013.01)
*G06F 21/78*     (2013.01)
(Continued)

(52) U.S. Cl.
CPC .......... *G06F 16/137* (2019.01); *G06F 21/602* (2013.01); *G06F 21/6209* (2013.01);
(Continued)

(58) Field of Classification Search
None
See application file for complete search history.

(56) References Cited

U.S. PATENT DOCUMENTS

| | | | |
|---|---|---|---|
| 9,397,985 B1 * | 7/2016 | Seger, II | H04L 63/0442 |
| 9,892,460 B1 * | 2/2018 | Winklevoss | G06Q 40/04 |

(Continued)

FOREIGN PATENT DOCUMENTS

| | | |
|---|---|---|
| AU | 2018100503 | 6/2018 |
| KR | 1020160064128 | 6/2016 |
| KR | 101727525 | 4/2017 |

OTHER PUBLICATIONS

BBDS: Blockchain-Based Data Sharing for Electronic Medical Records in Cloud Environments. Xia et al. MDPI (Year: 2017).*

(Continued)

*Primary Examiner* — Venkat Perungavoor
(74) *Attorney, Agent, or Firm* — Womble Bond Dickinson (US) LLP (57) ABSTRACT

In one aspect, the present disclosure provides a system and method for distributed data storage and delivery using blockchain. For example, a file can be received from a participant and split into constituent files. A hash value for the received file and each of the constituent files can be generated, and the constituent files can be encrypted using one or more predetermined or user selected encryption keys. The encrypted files can be stored in at least one storage location. Upon receiving a file retrieval request, each file of the plurality of encrypted files can be retrieved and decrypted using the one or more predetermined or user selected encryption keys. A hash value for each decrypted file can be generated and compared to hash values for the corresponding files of the plurality of constituent files, or a hash value for the recombined constituent files can be generated and compared to the hash value for the original file. Other aspects also are described.

20 Claims, 4 Drawing Sheets

(51) Int. Cl.
    *G06F 16/13* (2019.01)
    *G06F 21/62* (2013.01)
    *G06F 21/60* (2013.01)
    *H04L 9/14* (2006.01)
    *H04L 9/06* (2006.01)
    *H04L 29/08* (2006.01)
    *H04L 9/12* (2006.01)

(52) U.S. Cl.
    CPC ............ *G06F 21/78* (2013.01); *H04L 9/0631* (2013.01); *H04L 9/0637* (2013.01); *H04L 9/0643* (2013.01); *H04L 9/14* (2013.01); *H04L 67/1097* (2013.01); *G06F 2221/2107* (2013.01); *H04L 67/06* (2013.01); *H04L 2209/38* (2013.01)

(56) References Cited

U.S. PATENT DOCUMENTS

| | | | | |
|---|---|---|---|---|
| 9,998,539 | B1* | 6/2018 | Brock | ................ H04L 67/1097 |
| 10,114,969 | B1* | 10/2018 | Chaney | ................ H04L 9/3247 |
| 2011/0107112 | A1 | 5/2011 | Resch | |
| 2012/0331088 | A1 | 12/2012 | O'Hare et al. | |
| 2016/0261404 | A1* | 9/2016 | Ford | ..................... H04L 67/104 |
| 2016/0292178 | A1* | 10/2016 | Manville | ............. G06F 16/1752 |
| 2016/0342976 | A1* | 11/2016 | Davis | ................. G06Q 20/3829 |
| 2017/0344580 | A1* | 11/2017 | King | ..................... G06F 16/137 |
| 2018/0191502 | A1* | 7/2018 | Karame | ............... G06F 21/6245 |
| 2019/0342084 | A1* | 11/2019 | Mehedy | ................ H04L 9/0825 |

OTHER PUBLICATIONS

ProvChain: A Blockchain-based Data Provenance Architecture in Cloud Environment with Enhanced Privacy and Availability. Liang et al IEEE. (Year: 2017).*

International Search Report and Written Opinion for International Application No. PCT/US2019/049219 dated Dec. 23, 2019, 13 pages.

* cited by examiner

SYSTEMS AND METHODS FOR DISTRIBUTED DATA STORAGE AND DELIVERY USING BLOCKCHAIN

The present disclosure is, in one aspect, directed to systems and methods for data storage and delivery, and in particular, secure, distributed data storage and delivery systems and methods using blockchain. Other aspects are also described.

BACKGROUND

Current data storage and delivery systems may be highly susceptible to hacking, tampering, etc. and also do not effectively provide adequate methods to track participant or customer usage. Accordingly, a need exists for systems and methods for secure, distributed data storage and delivery. Blockchain technology offers an environment that provides the highest level of security, compliance, transparency and trust among participants. Blockchain technology offers trust and security by applying cryptography to ensure the safety of a transaction. The transaction histories further can be made available almost instantly. Accordingly, the present disclosure addresses the foregoing and other related and unrelated problems/issues in the art.

SUMMARY

In one aspect, the present disclosure is directed to a system for data storage and delivery using blockchain. The system can include a website, an application, a mobile application, file transfer program ("FTP"), such as a secure file transfer program ("SFTP"), etc. that can be accessed by participants to store and deliver data files. For example, participants can access the website, application, mobile application, FTP/SFTP, etc. by providing authentication credentials (e.g., participant selected authentication credentials, such as a user name, password, etc.) or using other suitable multifactor authentication methods. The participants can upload one or more files to the system using an interface (e.g., a GUI or other suitable interfaces) of the website, application, mobile application, FTP/SFTP, etc.

The system further includes one or more components or modules configured to split the uploaded files into smaller, constituent files. The system also can include one or more modules or components that are configured to generate a hash or hash value of the original file and the smaller, constituent files (e.g., by applying a hash function, such as a SHA256 or RIPEMD function, to electronic information of the smaller, constituent files). Competing goals of security, costs and performance can be balanced by adjusting the number of constituent files the original file is broken into and where the constituent files are stored.

The system also can include an encryption component or other suitable component or module that is configured to encrypt the smaller, constituent files using participant supplied or otherwise selected encryption keys. Upon encryption of the constituent files, the system may provide the encrypted, constituent files to one or more storage locations. In one variation, the system can provide the encrypted, constituent files to a plurality of storage locations (e.g., two or more cloud-based storage systems, such as Amazon Web Services (AWS), Interplanetary File System (IPFS), etc.) for redundancy. The system also can identify or locate the encrypted, constituent files in the storage locations based upon the generated hash values of the constituent files.

The system further generates one or more transactions including transaction information related to the uploaded files (e.g., including a transaction identifier, the type of file, participant information, status information, time information, hash values of the files, location information of the files, or other suitable transaction information). In one variation, the transaction identifier can include the generated hash or hash value of the original, uploaded file. The transaction information can be provided to a current block in the blockchain.

Other, additional participants or the participants who uploaded the file(s) can access the uploaded and stored file(s) through the application, mobile application, website, FTP/SFTP, etc. For example, the participants can authenticate with their credentials or using other suitable multifactor authentication or other authentication methods (e.g., providing biometric information, such as a fingerprint, facial scan, etc.) and access the system's website, application, mobile application, FTP, etc. After the participants have accessed the website, application, mobile application, FTP, etc., they can request retrieval of a specific file previously uploaded. The system then may retrieve the corresponding encrypted, constituent files associated with the requested file, for example by reference to the hash values for the constituent files or for the hash value of the original file stored in the blockchain.

In addition, the system may include one or more decryption components or modules that decrypt the encrypted, constituent files using the participant supplied or otherwise selected encryption keys. The system also includes one or more components or modules that hashes or generate a hash value of the decrypted constituent files or the recombined file (e.g., by applying a hash function, such as a SHA256 or RIPEMD function, to electronic information of the files).

The system can compare the hash values of the decrypted files with the hash values of the corresponding smaller, constituent files stored in the blockchain, e.g., to determine if the files have been corrupted, tampered with, or otherwise altered. If the hash values match, the decrypted files may be combined (e.g., using one or more components configured to combine files) to form a file that corresponds to the original, uploaded file. If one or more of the hash values of the decrypted files are different from (i.e., do not match) the values of the smaller, constituent files stored in the blockchain, however, the system may generate an error, alarm, or other notification warning, and provide the notification to the participant indicating that the files may have been tampered with or altered.

Upon recombining the constituent files, the recombined file can be transferred to the website, application, mobile application, etc. or other desired location or can be otherwise made available for access by the requesting participant.

In addition, or in an alternative embodiment, the system can compare the hash value of the original file with the hash value of the recombined file stored in the blockchain (and, if appropriate, first decrypting the hash values stored in the blockchain), e.g., to determine if the recombined file has been tampered with or otherwise altered. If the hash values match, the recombined file can be transferred to the website, application, mobile application, etc. or other desired location or can be otherwise made available for access by the requesting participant. If the hash value of the recombined file is different from (i.e., does not match) the value of the original file stored in the blockchain, however, the system may generate an error, alarm, or other notification warning, and provide the notification to the participant indicating that the files may have been tampered with or altered.

The system further can generate transaction information related to the retrieved files and original files to be stored in the blockchain (e.g., including a transaction identifier, the type of file, participant information, status information, time information, hash values of the files, location information of the files, or other suitable transaction information). In one variation, the transaction identifier can include the generated hash value of the recombined file.

Accordingly, the system can help to facilitate secure file transfer and storage and further help to provide safe guards against tampering with the stored files using file checks (e.g., the hash comparison) during retrieval of the files. The system according to the present discloser also can help to increase the speed, cost effectiveness, and security of cloud or IPFS storage. Additionally, the system can provide a substantially tamper proof transaction history utilizing the information stored in blockchain and, in one variation, provide an advanced dashboard to track participant usage.

In one aspect, a method for secure, distributed data storage and delivery can be provided. For example, an original file can be received from a participant. A hash value for the received original file can be generated. The received original file then can be split into a plurality of smaller, constituent files, and a hash value for each of the smaller, constituent files can be generated (e.g., by applying a hash function to electronic data of the smaller, constituent files). Each file of the plurality of smaller, constituent files also can be encrypted using one or more predetermined or user selected encryption keys to generate a plurality of encrypted, constituent files. Each file of the plurality of encrypted, constituent files then is stored in at least one storage location. In one variation, the plurality of encrypted files can be stored in two or more cloud-based storage locations, such as AWS, IPFS, etc., for redundancy. Transaction information also can be generated and provided to a current block in a blockchain. The hash value for each file of the plurality of constituent files, and the original file, as appropriate, also can be provided to the current block in the blockchain (e.g., as part of the transaction information).

Upon receipt of a file retrieval request from an additional participant(s) (or the participant who provided the original file) of the plurality of participants, the plurality of encrypted, constituent files can be retrieved, for example by reference to the hash values for the constituent files and for the original file stored in the blockchain, from the storage location(s). Thereafter, each file of the plurality of encrypted, constituent files can be decrypted, e.g., using the one or more predetermined or user selected encryption keys, to generate a plurality of decrypted, constituent files (e.g., that should correspond to the smaller, constituent files). A hash value for each of the decrypted, constituent files then can be generated and compared to the hash values of the corresponding smaller, constituent files stored in the current block of the blockchain, e.g., to determine whether the files were tampered with or otherwise altered.

If the hash values of the decrypted, constituent files match the corresponding hash values of the smaller, constituent files stored in the blockchain, the plurality of decrypted files can be combined to generate a file that relates to the original file. However, if one or more hash values for each of the plurality of decrypted files do not match the hash values of one or more of the corresponding smaller, constituent files (e.g., indicating corruption, tampering, altering, etc., or a failure in transmission, storage, decryption or retrieval), an alarm, warning, or other suitable notification can be generated and provided to the participants. Additional transaction information also can be generated and provided to a current block in the blockchain.

Upon recombining the constituent files, the recombined file can be transferred to the website, application, mobile application, etc. or other desired location or can be otherwise made available for access by the requesting participant. Additional transaction information also can be generated and provided to a current block in the blockchain.

Additionally, or in an alternative embodiment, a hash value for the recombined file can be generated and compared to the hash value of the original file stored in the current block of the blockchain, e.g., to determine whether the file was tampered with or otherwise altered. If the hash value of the recombined file matches the corresponding hash value of the original file stored in the blockchain, then the recombined file can be transferred to the website, application, mobile application, etc. or other desired location or can be otherwise made available for access by the requesting participant. However, if the hash value of the recombined file does not match the hash value of the original file (e.g., indicating corruption, tampering, altering, etc., or a failure in transmission, storage, retrieval, decryption or recombination), an alarm, warning, or other suitable notification can be generated and provided to the participants. Additional transaction information also can be generated and provided to a current block in the blockchain.

The above summary does not include an exhaustive list of all the aspects of the present disclosure. It is contemplated that the disclosure include all systems and methods that can be practiced from all suitable combinations of the various aspects summarized above, as well as those described in the detailed description below and particularly pointed out in the claims filed with the application. Such combinations have particular advantages not specifically recited in the above summary. Various objects, features and advantages of the present disclosure further will become apparent to those skilled in the art upon a review of the following detail description, when taken in conjunction with the accompanying drawings.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Several aspects of the disclosure with reference to the appended drawings are now explained. Whenever the shapes, relative positions with other aspects of the parts described are not explicitly defined, the scope of the invention is not limited only to the parts shown, which are meant merely for the purpose of illustration.

Figure 1:
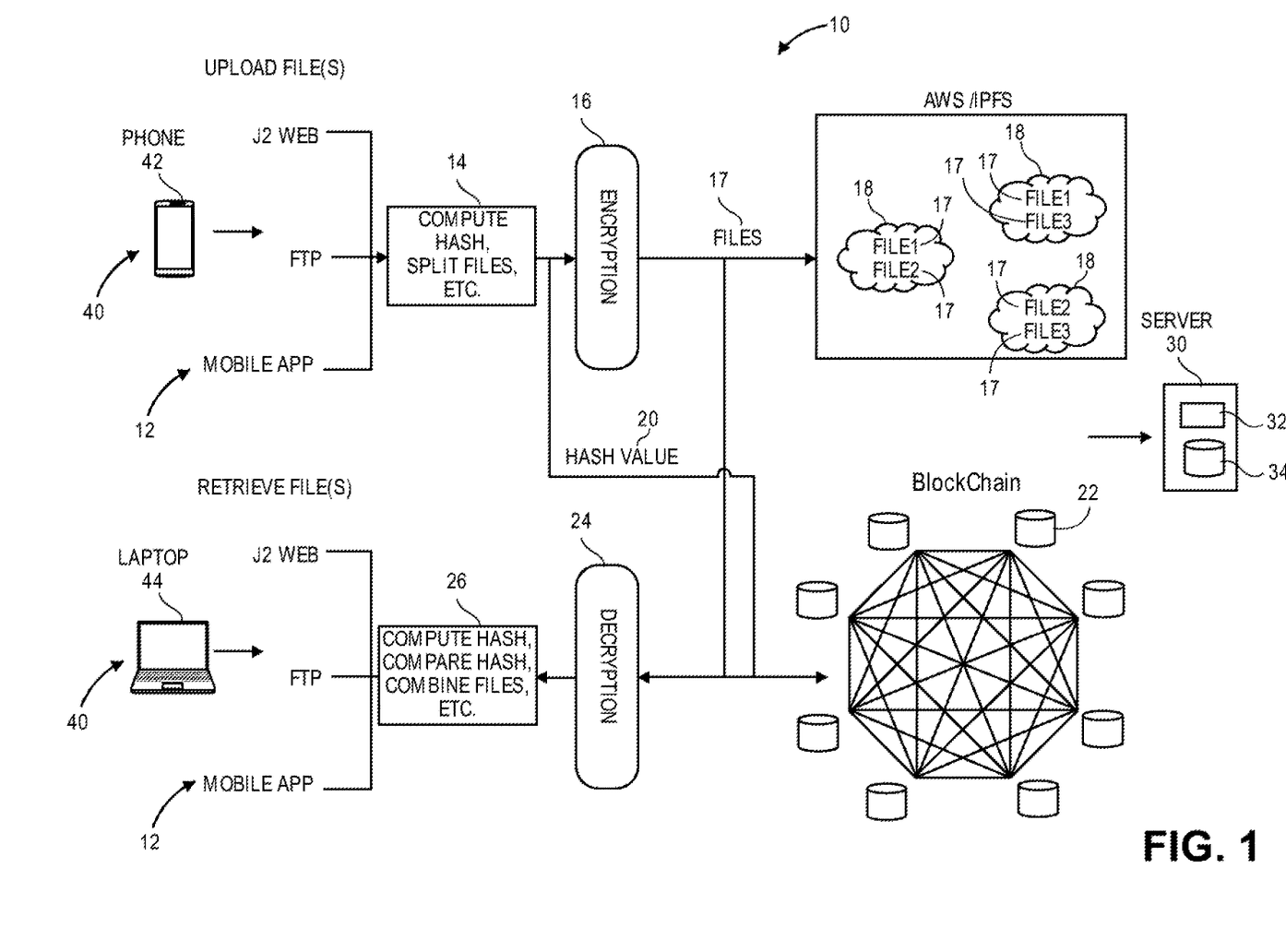
FIG. 1 illustrates a system for secure data storage and delivery using blockchain according to one aspect of the present disclosure.

FIG. 1 shows a data storage and delivery system 10 according to one aspect of the present disclosure. As shown in FIG. 1, the system 10 includes a website, an application, a mobile application, a file transfer program ("FTP"), such as secure file transfer program ("SFTP") or other suitable computer program product, platform, etc. 12 that can be accessed by participants to upload and retrieve files. For example, the participants can access the website, application, mobile application, FTP/SFTP, etc. 12 using user selected credentials/authentication information (e.g., a user name, password, answers to challenge response questions, etc.) or other suitable multifactor authentication or authentication methods (e.g., by providing biometric information, such as a fingerprint, facial scan, etc.). The system 10 (e.g., the website, application, mobile application, FTP/SFTP, etc. 12) further can include one or more interfaces that allows participants to upload files (e.g., participants can browse and select specific files for uploading, can drag specific files to areas that allow for uploading, etc.).

As additionally shown in FIG. 1, the system 10 includes one or more components or modules 14 that are configured to split the uploaded files into a plurality of smaller, constituent files. The one or more modules or components 14 also can be configured to hash or generate hash value of the original file and the smaller, constituent files. For example, the module(s)/component(s) 14 can apply a hash function, such as a SHA 256 function, RIPEMD function, etc. to electronic information of or otherwise related to the original file and the smaller, constituent files, e.g., to convert any input length to an output of a fixed length. The hash values of the smaller, constituent files (or the original file) can be provided to and stored in table or other suitable listing, index, grouping, spreadsheet, database, etc. The table, listing, grouping, etc. including/storing the hash values can be stored in any suitable storage location, such as cloud based storage (e.g., Amazon Web Service ("AWS"), Interplanetary File System ("IPFS"), etc.) or other suitable storage location. It further will be understood that, though FIG. 1 may show the same component/module 14 performing the splitting and hashing operations, any number of components or modules (e.g., two or more separate components/modules) can perform the splitting and hashing operations.

The system 10 further can include an encryption component 16 or other suitable module or component that encrypts the smaller, constituent files split from the uploaded file using one or more participant-supplied or otherwise selected encryption keys to generate encrypted files 17. For example, the encrypter 16 can apply an encryption function (such as AES function, e.g., AES256 function, RSA function, DES function, etc.) to electronic data/information of or otherwise related to each file of the plurality of smaller, constituent files. The system 10 may provide the encrypted, constituent files 17 to one or more storage locations 18. In one example, the system 10 may provide the encrypted, constituent files 17 to a plurality of storage locations (e.g., two or more cloud-based storage locations 18, such as AWS, IPFS, etc.) for redundancy.

The system 10 further can create transaction information related to the uploaded files, and provide transaction information to a blockchain 22 along with hash values 20 and location information of the files. In one variation, the transaction information can include a transaction identifier, a file type, participant information, status information, time information, hash values of the original and smaller, constituent files, location information of the files, or other suitable transaction information related to the original files; the smaller, constituent files; the encrypted and stored files, etc. In one embodiment, the transaction identifier can include the generated hash value of the original, uploaded file.

Additional participants (or the participants who uploaded the file(s)) can access the uploaded files through the website, application, mobile application, FTP/SFTP, etc. 12. For example, the participants accessing the website, application, mobile application, FTP/SFTP (e.g., upon authenticating can initiate a request for retrieval of a specific file previously uploaded to the system. The system 10 then may, for example, by reference to the hash values for the constituent files and for the original file stored in the blockchain, retrieve all of the corresponding encrypted, constituent files 17, and further may provide the files 17 to one or more components or modules 24 that decrypt the encrypted, constituent file associated with the requested file using the participant-supplied or otherwise selected encryption keys.

The one or more components/modules 26 additionally hashes or generates a hash value of the decrypted files (e.g., by applying a hash function, such as a SHA 256 function, RIPEMD function, etc., to electronic information of or otherwise related to the decrypted files), and compares the hash values of the retrieved files with the hash values of the corresponding smaller, constituent files stored in the blockchain 22, e.g., to determine whether the files have been tampered with, altered, or are otherwise different from the corresponding smaller, constituent files. If the hash value of the retrieved, decrypted files corresponds to the hash values of the corresponding constituent files stored in the blockchain 22, the decrypted, constituent files may be combined, e.g., by components/modules 26, to generate a recombined file that corresponds to the original, uploaded file. If the hash values are different (i.e., do not match or correspond), however, the system 10 may generate an error, warning, or other suitable notification and provide it to the participants (e.g., the error notification can be provided to the participants via SMS text, email, etc.). In addition, if the hash value of the retrieved, decrypted files corresponded to the hash values of the corresponding constituted files stored in the blockchain 22, the recombined file can be transferred to an interface of the application, mobile application, website, FTP/SFTP, etc. or other desired location to allow the participants to access the file.

Alternatively, for additional validation, if the hash values of the decrypted files matched the hash values of the constituent files stored in the blockchain 22, the one or more components/modules 26 may additionally hash or generate a hash value of the recombined file (e.g., by applying a hash function, such as a SHA 256 function, RIPEMD function, etc., to electronic information of or otherwise related to the recombined file), and compare the hash value of the recombined file with the hash value of the original file stored in the blockchain 22, e.g., to determine whether the recombined file has been corrupted, tampered with, altered, etc. or is otherwise different from the original, uploaded file. If the hash value of the recombined file corresponds to the hash value of the corresponding original file stored in the blockchain 22, the recombined file can be transferred to an interface of the application, mobile application, website, FTP/SFTP, etc. or other desired location to allow the participants to access the file. If the hash values are different (i.e., do not match or correspond), however, the system 10 may generate an error, warning, or other suitable notification and provide it to the participants (e.g., the error notification can be provided to the participants via SMS text, email, etc.).

Though FIG. 1 shows the same component/module 26 performing the hashing, comparing, combining, etc. operations, any number of components or modules (e.g., two or more separate components/modules) can perform these operations without departing from the scope of the present disclose. It will further be understood by those of ordinary skill in the art that though multiple components/modules are shown to perform the various operations of the system 10, a single component/module, or any other suitable number or combination of components or modules, can perform the operations of the system without departing from the scope of the present disclosure.

The system 10 further can generate additional transaction information related to the retrieval of the files and store the information in the blockchain 22. In one variation, the additional transaction information can include a transaction identifier, a file type, participant information, status information, time information, hash values of the files, location information of the files, or other suitable transaction information related to the retrieved files; the decrypted file; the combined files, etc. In one embodiment, the transaction identifier can include the hash or hash value of the recombined file. Accordingly, the system can help to provide a substantially tamper proof transaction history utilizing the blockchain, and also can increase the speed, cost effectiveness and security of the cloud-based storage or transaction/database.

Additionally, the system can provide a substantially tamper proof transaction history utilizing the information stored in blockchain. In one variation, the system can provide an advanced dashboard (e.g., on its interface, GUI, etc.) including information stored in the blockchain to track participant usage.

The system 10 further can include a server 30 or other suitable computing device, e.g., at a data or control center managed by a data service provider or other suitable entity, which server/computing device 30 can have one or more processors 32 and one or more memories 34 configured to store instructions for execution by the one or more processors. The various components/modules of the data storage system 10 described above can include workflows, program instructions, etc. stored in the one or more memories 34, and executed by the processors 32. Additionally, or in the alternative, one or more components of the system 10 can be web-based or cloud-based and stored and accessed from one or more memories or storage of the computing device (such as a server) that is part of a data management center managed by a web or Cloud service provider or other suitable entity. Additionally, or in the alternative, one or more components of the system can be resident on or accessed by participant managed computing devices 40 (described below).

For example, the participants can access the website, FTP/SFTP, application, mobile application, etc. 12 using their managed computing devices 40, which can be in communication with the system 10 through a network. The participant managed devices 40 can include, but are not limited to, handheld mobile devices, such as mobile phones 42, smart phones, tablets, PDAs or other suitable mobile computing devices; personal computing devices, such as laptops 44, desktops, work stations, etc.; or any other suitable computing devices. The managed computing devices 40 can have one or more processors and one or more memories. The computing devices 40 can be configured to access one or more networks, such as the internet, peer-to-peer networks, or any other suitable private or public networks or combinations thereof, to enable the participants to access the website, application, mobile application, FTP, etc. so as to upload, access, retrieve, etc. files. These devices can access the network through wired connections, e.g., an Ethernet cable, or wireless connections, e.g., Wi-Fi, Bluetooth®, cellular connections, e.g., 3G, 4G, LTE, 5G, etc., or combinations thereof.

The processors of the computing devices 30, 40 can include a central processing unit (CPU) or hardware or software control logic, ROM, and/or other types of non-volatile memory, and the memories can include random access memory (RAM) or (ROM). The computing devices 30, 40 further may include one or more ports for communicating with external devices and various input and output (I/O) devices, such as a keyboard, a mouse, a touch screen and/or video display. However, the computing devices 30, 40 may include any suitable computing components operable to compute, calculate, determine, classify, process, transmit, receive, retrieve, originate, switch, store, display, communicate, manifest, detect, record, reproduce, handle, or utilize any form of information or data for any suitable purpose.

Figure 2A:
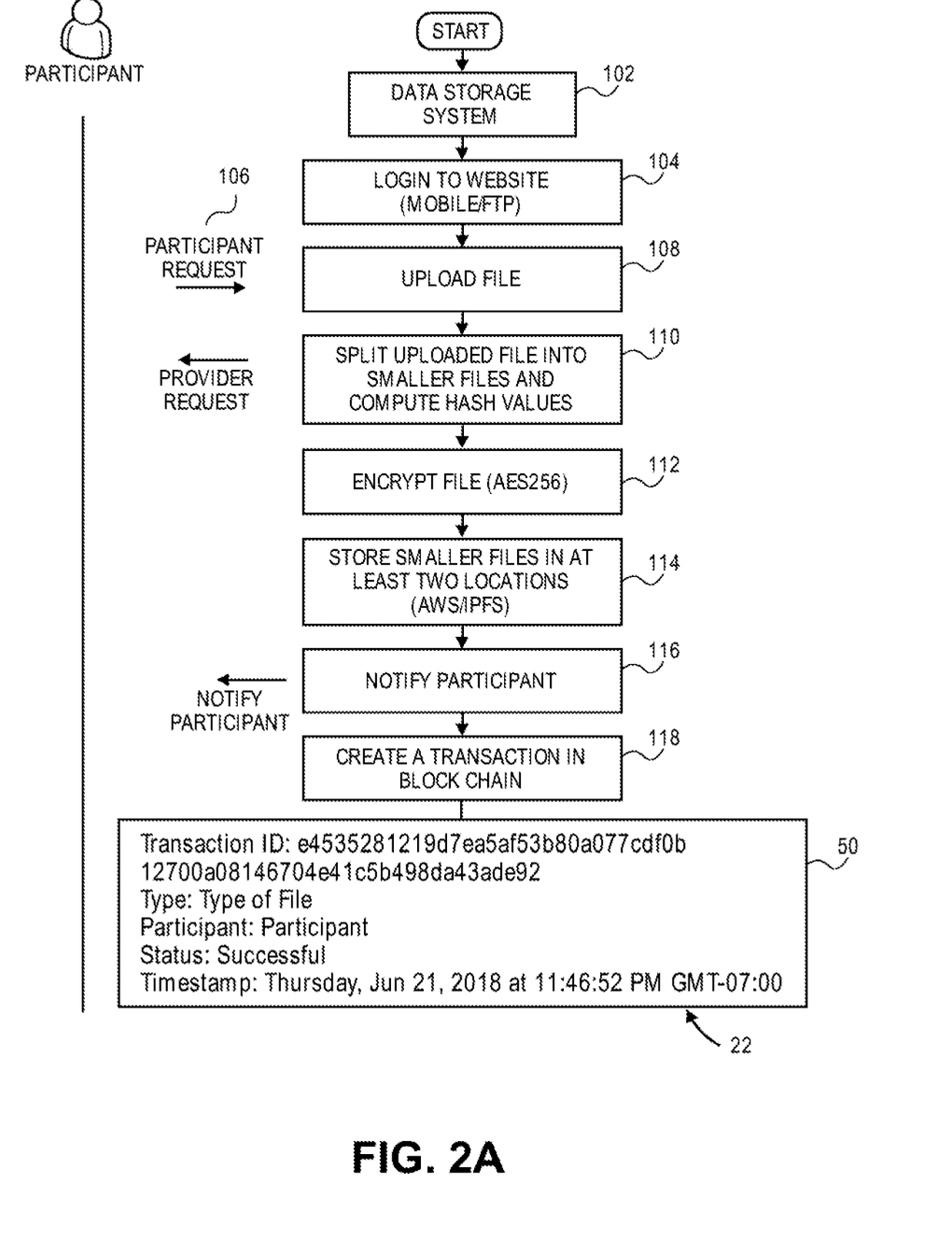
FIGS. 2A and 2B provide a flow diagram for a method or process for secure data storage and delivery using blockchain according to one aspect of the present disclosure.
Figure 2B:
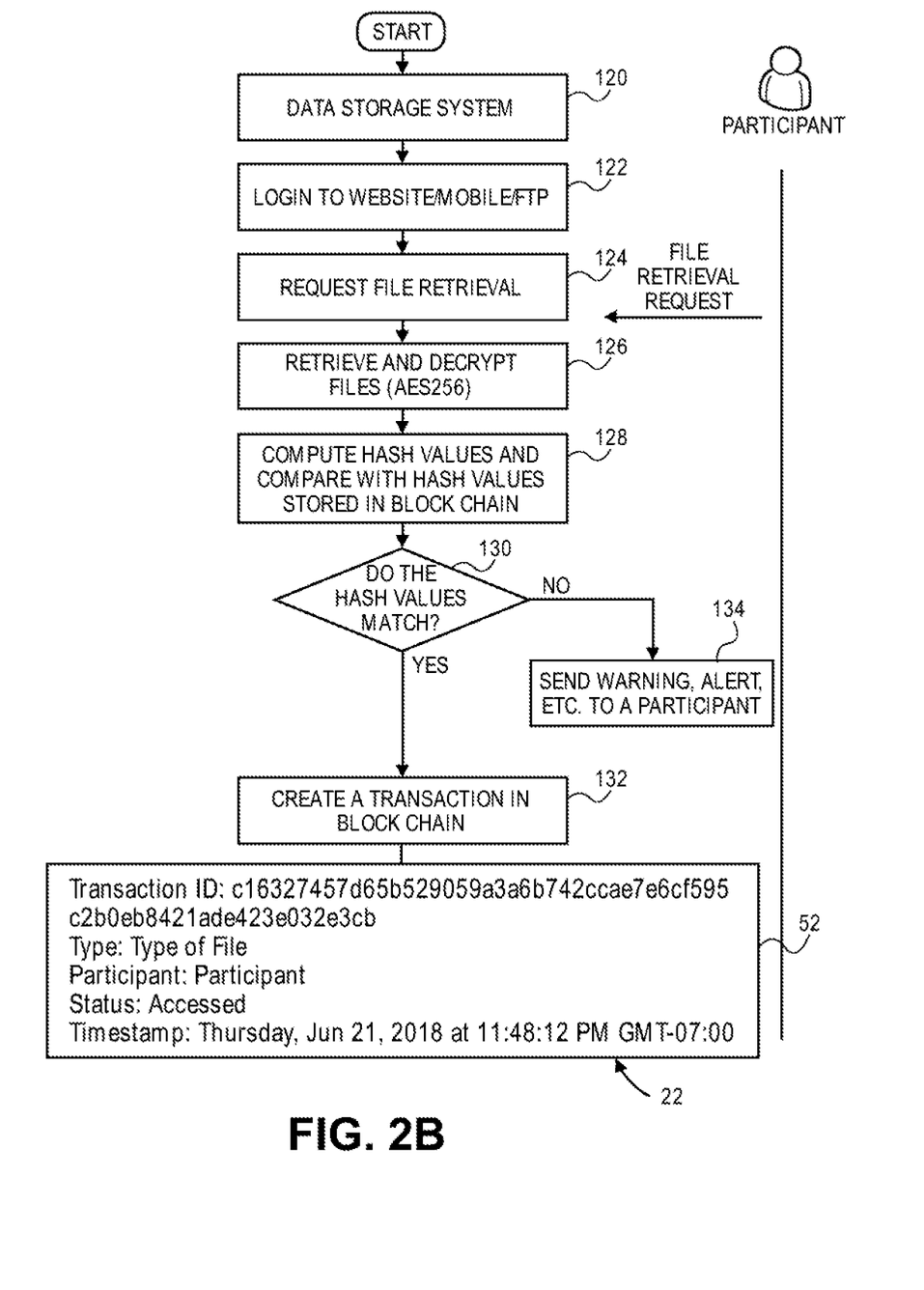

FIGS. 2A and 2B show a flow diagram for secure data storage and delivery using blockchain according to one aspect of the present disclosure. As shown in FIG. 2A, a participant (e.g., a first participant) can initiate the data storage system at 102, and, for example, the participant can log in to a website, application, mobile application, a secure file transfer program ("SFTP") or other suitable file transfer program ("FTP") to access the document service provider at 104. The participant can provide a request to upload a file, e.g., by selecting/clicking on one or more icons, selectable objects, etc. at 106, and then the participant can upload the selected file(s) at 108.

Thereafter, at 110, the data storage system generates a hash value for the uploaded file, splits the uploaded file into smaller, constituent files, and also generates hash values for each of the smaller, constituent files (e.g., by applying a hash function, such as a SHA 256 function, RIPEMD function, etc., to electronic information of or otherwise related to the smaller, constituent files). The system then encrypts each of the smaller, constituent files (e.g., using an encryption function, such as an AES256 function) at 112. The data storage system provides and stores the encrypted, constituent files in at least two locations at 114 (e.g., AWS or IPFS) for redundancy, and at 116, the system notifies (e.g., by SMS message, email, etc.) the participant or other participants that the files have been uploaded/saved, as generally shown in FIG. 2A.

In addition, at 118, FIG. 2A shows that the data storage system generates a transaction and stores the transaction in a current block 50 of the blockchain 22. For example, the transaction can include transaction information including a transaction ID, which can include the hash value of the original file, a file type (e.g., PDF, word document, GIF, JPEG, WAV, MP3 etc.), participant information, a status of the transaction, and time information, such as a time stamp, that is provided to the current block 50 in the blockchain 22 (FIG. 2A).

Thereafter, as shown in FIG. 2B, another participant (or the same participant) can access the uploaded and stored files. For example, the participants (e.g., a second participant or the first participant) can initiate the data storage system at 120. For example, the participants can log in to the website, application, mobile application, FTP, etc., at 122, and can generate a file retrieval request to access the uploaded and stored files (e.g., by selecting one or more icons or other commands) at 124 (FIG. 2B).

Upon receipt of the file retrieval request, the data storage system can retrieve and decrypt each of the encrypted, constituent files corresponding to the requested file (e.g., with reference to the hash values of the constituent files) as 126. The data storage system additionally can compute hash values for each of the decrypted constituent files, and compare the hash value of the decrypted files with the hash value stored in the blockchain for the corresponding constituent files at 128 (i.e., the data storage system determines if the hash values correspond or match at 130), as generally shown in FIG. 2B.

If the hash values of the decrypted files match the hash value of the constituent files stored in the blockchain, the data storage system combines the files to create a file that relates to the original, uploaded file. If the hash values do not match hash values stored in the blockchain, at 128, the data storage system can send a warning to one or more of the participants (e.g., to the first and second participants) to indicate that the files may have been tampered with or otherwise altered at 134.

Further, if the hash values of the decrypted files match the hash value of the constituent files stored in the blockchain, the data storage system may provide the recombined file to the user, and also create a transaction with transaction information and provide the transaction information to a current block 52 in the blockchain 22. The transaction information includes but is not limited to a transaction ID, which in some embodiments can include a hash of the recombined file; a file type (e.g., PDF, word document, GIF, JPEG, WAV, MP3 etc.); information on the participants; a status of the transaction; time information; etc. as generally shown in FIG. 2B.

Alternatively, for additional validation, if the hash values of the decrypted files matched the hash value of the constituent files stored in the blockchain, the data storage system may compare the hash value of the recombined file with the hash value stored in the blockchain for the original file at 128 (i.e., the data storage system determines if the hash values correspond or match at 130), as generally shown in FIG. 2B. If the hash value of the recombined file matches the hash value of the original file stored in the blockchain, the data storage system provides the recombined file to the requesting participant, and also creates a transaction with transaction information and provides the transaction information to a current block 52 in the blockchain 22. The transaction information includes but is not limited to a transaction ID, a file type, information on the participants, a status of the transaction, time information, etc. as generally shown in FIG. 2B.

Figure 3:
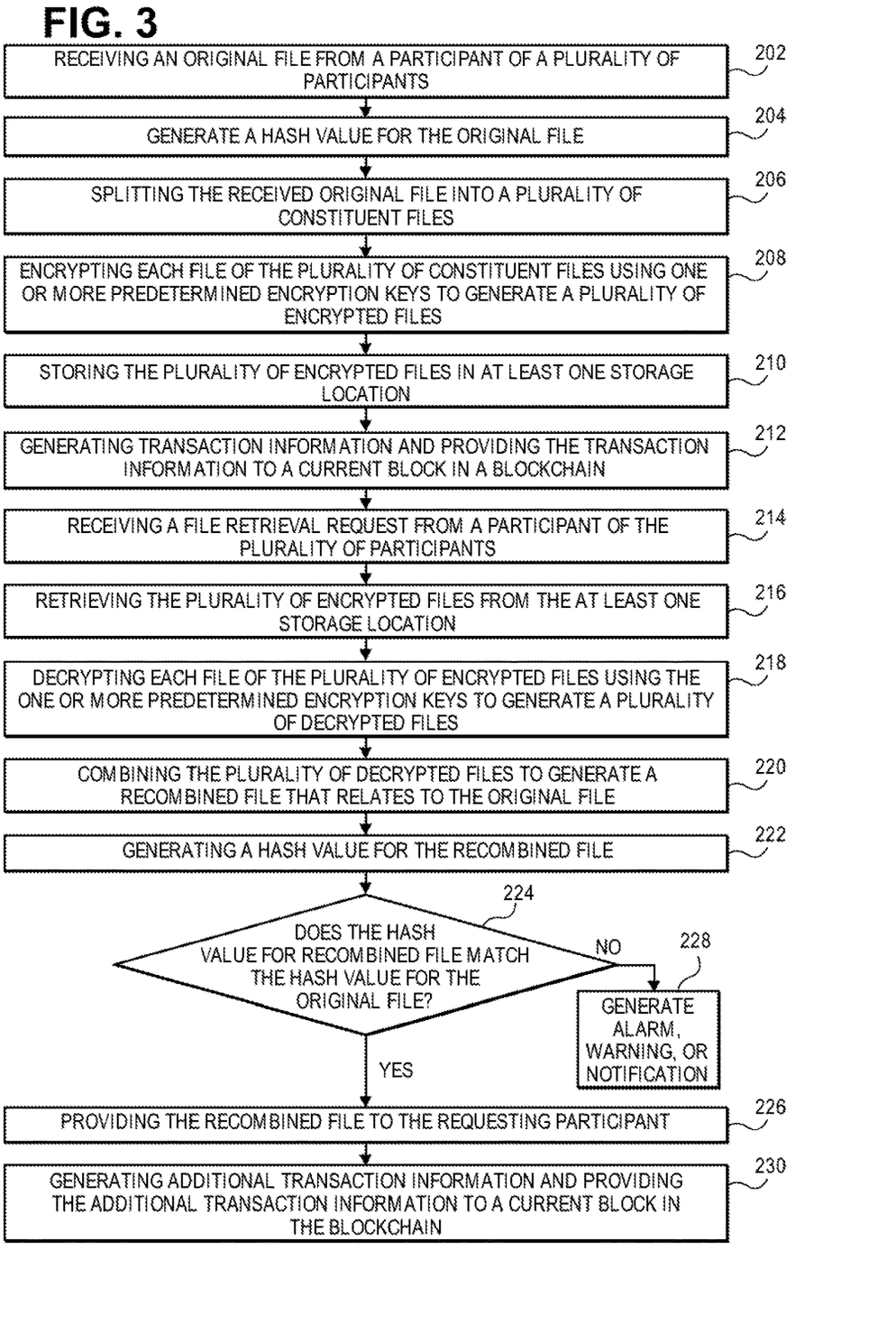
FIG. 3 provides a flow diagram for a method or process for secure data storage and delivery using blockchain according to one aspect of the present disclosure.

FIG. 3 shows a flowchart for method or process for secure data storage and delivery according to one aspect of the present disclosure. As shown in FIG. 3, at 202, an original file can be received from a participant of a plurality of participants. At 204, hash value for the received original file can be generated, and the received original file can be split into a plurality of smaller, constituent files at 206. In some embodiments, a hash value for each of the smaller, constituent files also can be generated.

Then, at 208, each file of the plurality of smaller, constituent file is encrypted using one or more predetermined encryption keys to generate a plurality of encrypted files. At 210, the plurality of encrypted files are stored in at least one storage location. In one variation, the plurality of encrypted files can be stored in a plurality of cloud-based storage locations, e.g., AWS, IPFS, etc., for redundancy. In some embodiments, the hash values of the smaller, constituent files may facilitate location of the encrypted files in the storage location(s).

At 212, transaction information can be generated and provided to a current block in a blockchain. In one variation, the hash values for the original file or each file of the plurality of constituent files also can be provided to the current block in the blockchain, e.g., as part of the transaction information.

Additionally, at 214, a file retrieval request can be received from a participant of the plurality of participants (e.g., the participant who uploaded the file or another participant). Upon receipt of the file retrieval request, the plurality of encrypted files can be retrieved from the storage location(s) at 216. Each file of the plurality of decrypted files then can be decrypted using the one or more predetermined encryption keys to generate a plurality of decrypted files at 218. At 220, the plurality of decrypted files can be combined to generate a recombined file that relates to the original file, and at 222, a hash value for the recombined file can be generated.

If the hash value for recombined file matches the hash value the original file as determined at 224, the recombined file can be provided or otherwise made available to the requesting participant at 226. However, if the hash value for the recombined file does not match the hash value for the original file, an alarm, warning, notification, etc. can be generated and provided to the participants at 228, e.g., to indicate that the files are corrupt, have been tampered with, or were otherwise altered. Further, at 230, additional transaction information can be generated and provided to a current block in the blockchain.

It will be understood by persons skilled in the art that one or more of the steps or actions (e.g., 202 to 230) shown in FIG. 3 can be omitted or rearranged, without departing from the scope of the present disclosure. For example, if the hash value of the recombined file does not match the hash value of the original file, hash values of the decrypted filed can be generated an compared to the hash values of the constituent files initially provided to the storage location, e.g., to determine which specific files of the constituent files have been corrupted, tampered with, or otherwise altered. Further, the storage location or devices/systems managing the storage location can be reverted or reset to a restore point, previous configuration, etc. in which the hash values of the constituent files match the hash values of the constituent files originally provided to the storage location (e.g., to a point/configuration prior to the corruption, tampering, alteration, etc.) to provide a recombined file that corresponds to the original, uploaded file.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various characteristics and features of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

What is claimed is:

1. A method for secure data storage and delivery, comprising:
   receiving a file uploaded by a user, and generating a hash value for the uploaded file;
   splitting the uploaded file into a plurality of constituent files, and generating a hash value for each file of the plurality of constituent files;
   encrypting each file of the plurality of constituent files using one or more predetermined or user selected encryption keys to generate a plurality of encrypted files, and storing the plurality of encrypted files in at least one storage location;
   generating transaction information including at least the hash value of the uploaded file and the hash values of the plurality of constituent files and providing the transaction information to a current block in a blockchain;
   upon receipt of a file retrieval request from the user or another user, retrieving the plurality of encrypted files from the at least one storage location, and decrypting each file of the plurality of encrypted files using the one or more predetermined or user selected encryption keys to generate a plurality of decrypted files;
   generating a hash value for each of the plurality of decrypted files and determining whether the hash values of the plurality of decrypted files match the hash values of the plurality of constituent files;
   if the hash values of the plurality of decrypted files match the hash values of the plurality of constituent files, combining the plurality of decrypted files to generate a recombined file;
   generating a hash value for the recombined file and determining whether the hash value for the recombined file matches the hash value for the uploaded file; and
   if the hash value for the recombined file matches the hash value for the uploaded file, providing the recombined file to the user or the other user, generating additional transaction information including at least the hash value of the recombined file, and providing the additional transaction information to a current block in the blockchain.

2. The method of claim 1, further comprising:
   generating an alarm, warning, or notification if the hash value for the recombined file or the hash values for each file of the plurality of decrypted files does not match the hash value for the uploaded file or the hash values for each corresponding file of the plurality of constituent files.

3. The method of claim 1, wherein each file of the plurality of constituent files are stored in at least two cloud-based storage locations.

4. The method of claim 1, wherein each of the plurality of constituent files are smaller than the original file.

5. The method of claim 1, wherein encrypting each file of the plurality of constituent files includes applying an encryption function to electronic data of each file of the plurality of constituent files, and wherein the encryption function includes an AES256 function.

6. The method of claim 1, wherein the transaction information relates to the uploaded file, the constituent files, or the encrypted files and includes a transaction identifier, a transaction type, participant information, status information, and time information.

7. The method of claim 1, wherein the transaction identifier includes the hash value for the uploaded file.

8. The method of claim 1, wherein the additional transaction information relates to the recombined file, the encrypted files, or the decrypted files and includes a transaction identifier, a transaction type, participant information, status information, and time information.

9. The method of claim 1, wherein generating a hash value for the uploaded file or for each of the constituent files includes applying a hash function to electronic data of the uploaded file or to electronic data of each of the constituent files, wherein the hash function comprises a SHA256 or a RIPEMD function.

10. A system for secure data storage and delivery, comprising:
    one or more processors; and
    one or more non-transitory computer readable storage mediums having instructions stored therein, the instructions, when executed by the one or more processors, causes the system to:
    receive an uploaded file, and generate a hash value for the file;
    split the uploaded file into a plurality of constituent files;
    generate a hash value for each file of the plurality of constituent files;
    encrypt each file of the plurality of constituent files using one or more predetermined or user selected encryption keys to generate a plurality of encrypted files, and store the plurality of encrypted files in at least one storage location;
    generate transaction information including at least the hash value of the uploaded file and the hash values of the plurality of constituent files, and provide the transaction information a current block in a blockchain;
    upon receipt of a file retrieval request, retrieve the plurality of encrypted files from the at least one storage location, and decrypt each file of the plurality of encrypted files using the one or more predetermined or user selected encryption keys to generate a plurality of decrypted files;
    generate a hash value for each of the plurality of decrypted files and determine whether the hash values of the plurality of decrypted files match the hash values of the plurality of constituent files;
    if the hash values of the plurality of decrypted files match the hash values of the plurality of constituent files, combine the plurality of decrypted files to generate a recombined file that relates to the uploaded file;
    generate a hash value for the recombined file or for each file of the plurality of decrypted files;
    determine whether the hash value for the recombined file matches the hash value for the uploaded file; and
    if the hash value for the recombined file matches the hash value for the uploaded file, allow access to the recombined file, generate additional transaction information including at least the hash value of the recombined file, and provide the additional transaction information to a current block in the blockchain.

11. The system of claim 10, wherein the system generates an alarm, warning, or notification if the hash value for the recombined file does not match the hash value for the uploaded file.

12. The system of claim 11, wherein each file of the plurality of constituent files are stored in at least two cloud-based storage locations.

13. The system of claim 11, wherein each of the plurality of constituent files are smaller than the uploaded file.

14. The system of claim 11, wherein an encryption function is applied to electronic data of each file of the plurality of constituent files to encrypt each file of the plurality of constituent files, wherein the encryption function includes an AES256 function.

15. The system of claim 11, wherein the transaction information relates to the uploaded file, the constituent files, or the encrypted files and includes a transaction identifier, a transaction type, participant information, status information, and time information, and wherein the additional transaction information relates to the recombined file, the encrypted files, or the decrypted files and includes a transaction identifier, a transaction type, participant information, status information, and time information.

16. A method, comprising:
receiving and splitting an uploaded file into a plurality of constituent files;
generating a hash value for the uploaded file and a hash value for each file of the plurality of the constituent files;
encrypting each file of the plurality of constituent files using one or more predetermined or user selected encryption keys to generate a plurality of encrypted files, and storing the plurality of encrypted files in a plurality of storage locations; and
generating and providing transaction information including the hash value for the uploaded file to a current block in a blockchain;
upon receipt of a file retrieval request from one or more users, retrieving the plurality of encrypted files from the at least one storage location, decrypting each file of the plurality of encrypted files using the one or more predetermined or user selected encryption keys to generate a plurality of decrypted files;
generating a hash value for each file of the plurality of decrypted files, and determining whether the hash value for each file of the plurality of decrypted files matches the hash value for each corresponding file of the plurality of constituent files;
combining the plurality of decrypted files to generate a recombined file that relates to the uploaded file;
generating a hash value for the recombined file and determining whether the hash value for the recombined file matches the hash value for the uploaded file; and
notifying the one or more users if the hash value for the recombined file does not match the hash value for the uploaded file.

17. The method of claim 16, further comprising:
generating an alarm, warning, or notification if the hash value for each file of the plurality of decrypted files does not match the hash value for each corresponding file of the plurality of constituent files.

18. A method, comprising:
receiving a file retrieval request from a participant;
upon receipt of the file retrieval request, retrieving, from a plurality of storage locations, a plurality of encrypted files that correspond to a plurality of constituent files split from an original file;
decrypting each file of the plurality of encrypted files using one or more predetermined or user selected encryption keys to generate a plurality of decrypted files;
determining whether hash values for each file of the plurality of decrypted files match hash values for corresponding files of the plurality of constituent files;
combining the plurality of decrypted files to generate a recombined file that relates to the original file;
verifying that the recombined file corresponds to the original value by comparing a hash value of the recombined file to a hash value of the original file; and
generating transaction information and providing the transaction information to a current block in the blockchain.

19. The method of claim 18, further comprising:
generating an alarm, warning, or notification, if the hash value for the recombined the does not match the hash value for the original file.

20. The method of claim 18, further comprising:
generating an alarm, warning, or notification, if the hash values for each file of the plurality of decrypted files do not match the hash values for corresponding files of the plurality of constituent files.

* * * * *